(12) United States Patent
Jansen

(10) Patent No.: US 6,250,602 B1
(45) Date of Patent: Jun. 26, 2001

(54) POSITIVE SHUT-OFF METERING VALVE WITH AXIAL THREAD DRIVE

(75) Inventor: Harvey B. Jansen, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 0 days.

(21) Appl. No.: 09/483,158

(22) Filed: Jan. 14, 2000

Related U.S. Application Data
(60) Provisional application No. 60/116,174, filed on Jan. 18, 1999.

(51) Int. Cl.[7] .................................................. F16K 31/02
(52) U.S. Cl. ...................... 251/129.11; 251/124; 251/903; 60/39.281; 60/243
(58) Field of Search ............................ 251/129.11, 903, 251/123, 124; 60/243, 270.1, 39.281

(56) References Cited

U.S. PATENT DOCUMENTS

| | | |
|---|---|---|
| 3,848,806 | 11/1974 | Samuelsen et al. . |
| 4,383,553 * | 5/1983 | Platt ................................. 251/124 X |
| 4,524,914 | 6/1985 | Kaibara et al. . |
| 4,561,468 | 12/1985 | Kreitchman et al. . |
| 4,593,881 * | 6/1986 | Yoshino ...................... 251/129.11 X |
| 5,706,856 * | 1/1998 | Lancaster .......................... 251/268 X |
| 5,722,634 | 3/1998 | Hrytzak et al. . |
| 5,806,301 * | 9/1998 | auBuchon et al. ...................... 60/204 |
| 6,016,832 * | 1/2000 | Vars et al. .................... 251/129.11 X |

* cited by examiner

*Primary Examiner*—Kevin Lee
(74) *Attorney, Agent, or Firm*—Quarles & Brady LLP

(57) ABSTRACT

Disclosed herein is a fuel/ignitor valve for metering liquid or gaseous fuel having a servo motor-actuated pintle providing rapid flow rate adjustment response and positive flow shut-off. The fuel flows from an inlet port through a venturi passageway having a throat through which fuel flows at sonic velocity to an outlet port. The pintle has a stem at one end and a contoured head at an opposite end containing a circumferential seal for sealing the throat of the venturi passageway. A motor driven drive nut concentric with the pintle axis is threaded to the pintle stem. As the drive nut is rotated, a pin and slot arrangement causes the pintle to translate along the pintle axis. A force distribution assembly comprising a pair of annular thrust bearings in combination with annular thrust washers is disposed around the drive nut adjacent to each side of an annular flange of the drive nut. This assembly absorbs pressure loads acting on the pintle which would otherwise be transferred to the motor.

21 Claims, 4 Drawing Sheets

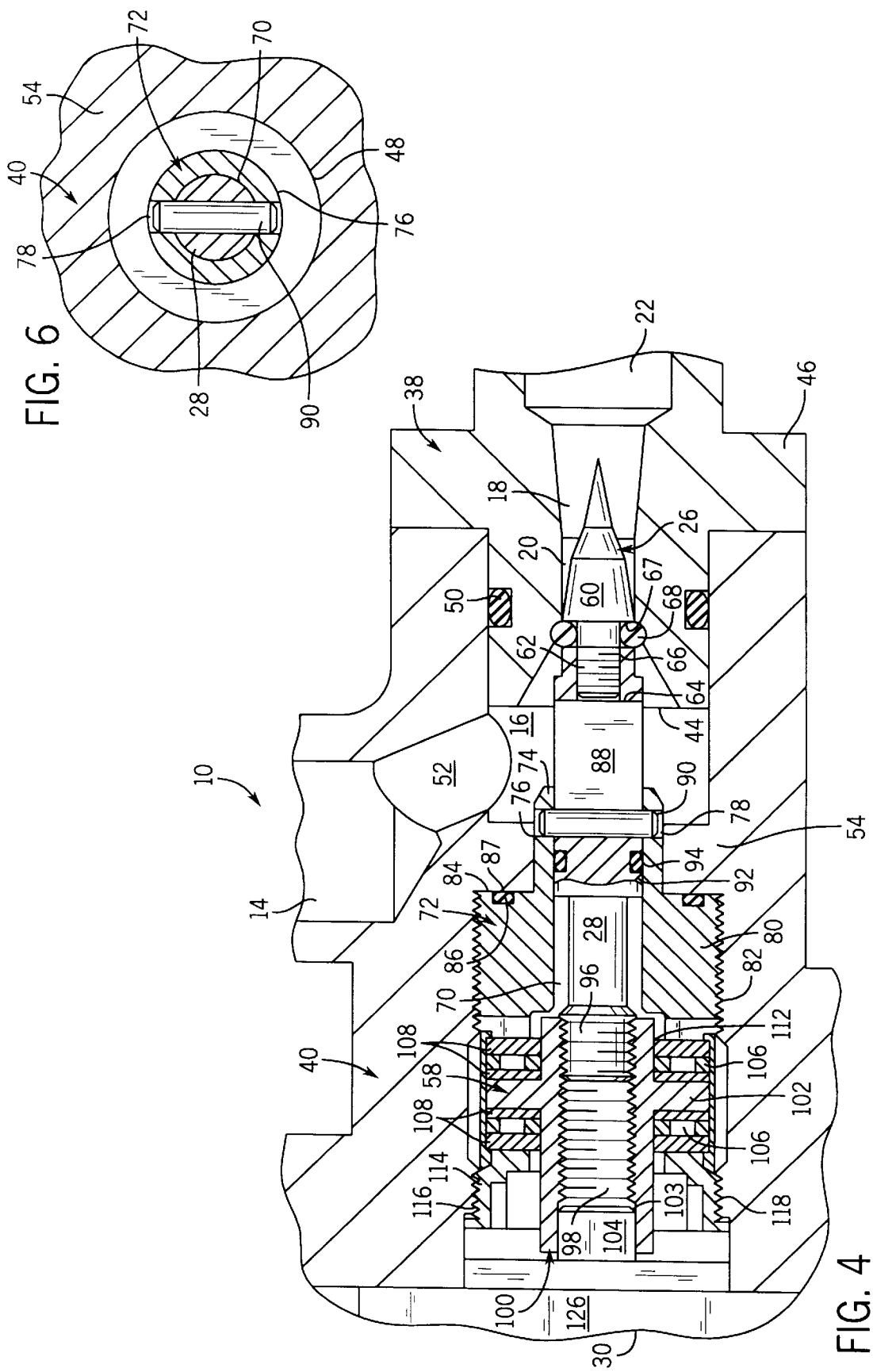

POSITIVE SHUT-OFF METERING VALVE WITH AXIAL THREAD DRIVE

CROSS-REFERENCE TO RELATED APPLICATIONS

This application claims benefit to provisional application Ser. No. 60/116,174, filed Jan. 18, 1999. +gi

STATEMENT REGARDING FEDERALLY SPONSORED RESEARCH OR DEVELOPMENT

This invention was developed with Federal Government support under Contract No. NAS1-97-110 awarded by the National Aeronautics and Space Administration. The Federal Government may retain certain rights to this invention.

BACKGROUND OF THE INVENTION

1. Technical Field

The present invention relates to metering valves, and in particular, to fuel and ignitor valves for use in air and space vehicles.

2. Description of the Related Art

Valves for metering fuel and other combustible media to engines in aircraft and spacecraft are well known in the art, see for example U.S. Pat. Nos. 3,848,806 and 4,561,468. Such valves are used to control the rate at which pressurized fuel is supplied to metering orifices in the combustion chamber through a fuel line. The valves are relied upon to provide consistent and rapid control of flow rates of fuel at various operational stages, such as ignition and during sustained operation as actuated by a servo motor or the like. Their operation is critical to proper performance of the vehicle. Poor valve operation can result in unintended engine shutdown and failure.

These valves often include movable stemmed valve members, or pintles, aligned with the outlet port of the valve for controlling the rate at which fuel flows to an engine. Pintle type valves are typically less affected by the temperatures and pressures of the fuel passing through the fuel chamber of the valve, due to their contoured head and axial movement. However, even pintle valves can be adversely affected by the high pressure conditions of jet engines. High pressure can cause large forces to act on the pintle so as to alter the flow rate of the fuel through the valve.

In one prior art design, the pintle of a metering valve is actuated by a servo motor mounted at right angles to the pintle axis. The servo motor has a pinion gear engaging a rack attached to the pintle, the rack extending along the pintle axis. The rack and pinion ensure that axial forces on the pintle are translated properly to the radial bearings of the servo motor; however, the rack and pinion provides a relatively high gear ratio that may not provide sufficient force on the pintle when used with smaller high speed servo motors. Accordingly, a helical spring is attached to the free end of the rack to provide a countervailing force on the pintle reducing the peak forces that the servo motor must overcome.

A drawback to the use of a spring is that it may only coincidentally balance the force on the pintle at certain valve openings and operating conditions. Further, it adds mass to the actuation mechanism slowing its response speed. The rack and pinion is complex and requires stabilizing guideways.

SUMMARY OF THE INVENTION

The present invention provides a simple and high speed metering valve using a compact axial drive where a shaft of the servo motor is aligned with the pintle axis. The axial drive is made possible by the use of a force plate and thrust bearing to accept the axial pintle load in lieu of the servo motor bearings. A threaded coupling between the servo motor and pintle shaft provide a simple and reliable drive providing effective high gear ratios with low rotational and translational inertia. The valve has a pintle that when fully extended positively seals a nozzle passageway leading to the outlet port.

Specifically, the present invention is a valve for metering liquid or gaseous fuel from a fuel supply. The valve has a housing defining a fuel chamber in communication with an inlet port coupled to the fuel supply and an outlet port. A nozzle passageway joins the fuel chamber to the outlet port. The nozzle passageway is preferably a venturi opening having a throat through which the fuel flows at sonic velocity. The valve has a pintle extending along a pintle axis concentric with the nozzle passageway. The pintle has a stem at one end and a contoured head at an opposite end. The pintle head has a seal about its circumference. The valve also has an axial drive assembly concentric with the pintle axis and in threaded communication with the pintle stem. The pintle moves along the pintle axis from a retracted position allowing passage of fuel through the outlet port to an extended position in which the circumferential seal closes the passageway so that no fuel can exit the outlet port. The drive assembly has a force plate in communication with a thrust bearing for transferring to the housing pressure forces acting on the pintle.

In one preferred form, the axial drive assembly includes an actuator, preferably a servo motor, having a rotatable shaft concentric with the pintle axis. The drive assembly also includes a drive nut coupled to the actuator shaft at one end and having threads at an opposite end for engaging a threaded end of the pintle stem. This direct, axial drive provides a highly reliable and accurate mechanism for positioning the pintle.

Additionally, the valve may have a fixed member secured to the housing and contacting the pintle such that rotation of the drive nut causes translation of the pintle along the pintle axis between the retracted and extended positions. In one embodiment, the pintle stem has an axially extending transverse slot in which is disposed a pin fixed to the housing for preventing the pintle from rotating. The pin is fixed to the housing at a pintle guide defining a transverse bore aligned with the transverse pintle stem slot.

In another preferred form, the drive assembly is isolated from the fuel. In particular, the pintle is disposed within an axial bore within the housing and the pintle stem includes a seal about its circumference located so as to seal the axial bore throughout the stroke of the pintle. In one embodiment, the axial bore is defined by the pintle guide. The pintle stem seal seals the axial bore of the pintle guide throughout the stroke of the pintle thereby isolating the axial drive assembly from fuel in the fuel chamber. Thus, the drive assembly is not subjected to wear inducing contaminants that may be present in the fuel.

In yet another preferred form, the force plate is an annular flange of the drive nut, and the drive assembly further includes at least one annular thrust washer. Specifically, the drive nut flange is flanked by two annular thrust bearings each disposed between two annular thrust washers. A containment sleeve is disposed about the outer diameter of the thrust washers and bearings, held fixed by an interference fit between the pintle guide and a retaining nut fixed to the housing. This arrangement ensures that the threaded connections will not separate from vibration. Thus, the valve of the present invention provides a simple, axially aligned force distribution assembly that transfers fuel pressure forces acting on the pintle to the housing rather than the motor. This assembly prevents the pressure forces increasing the load on the motor which could reduce its responsiveness and operational life. Moreover, routing the pressure forces away from the motor allows the valve to more accurately adjust the position of the pintle and thereby the fuel flow rate.

In still another preferred form, the pintle head and stem are joined at a threaded connection. In this way, the pintle head may be replaced with a pintle head of different contour so as to change the flow rate of media through the valve. A locking insert is preferably disposed at the mated threads to prevent the pintle head from separating from the pintle stem.

Thus, the highly responsive and reliable axial drive mechanism and positive shut off of the nozzle render the valve of the present invention suitable to meter fuel to gas turbines and jet engines. In particular, these characteristics of the valve allow it to be used in vehicles having supersonic combustion ramjet (SCRAMJET) engines for hypersonic air and space travel. These and still other advantages of the present invention will be apparent from the description of the preferred embodiments which follow.

BRIEF DESCRIPTION OF THE DRAWINGS

FIG. 4 is an enlarged cross-sectional view similar to FIG. 3 showing the pintle in an extended position with a pintle seal positively closing off an outlet port;

FIG. 6 is a cut-away cross-sectional view taken along line 6—6 of FIG. 4 showing a pin and slot connection of the pintle stem.

DETAILED DESCRIPTION OF THE PREFERRED EMBODIMENTS

Figure 1:
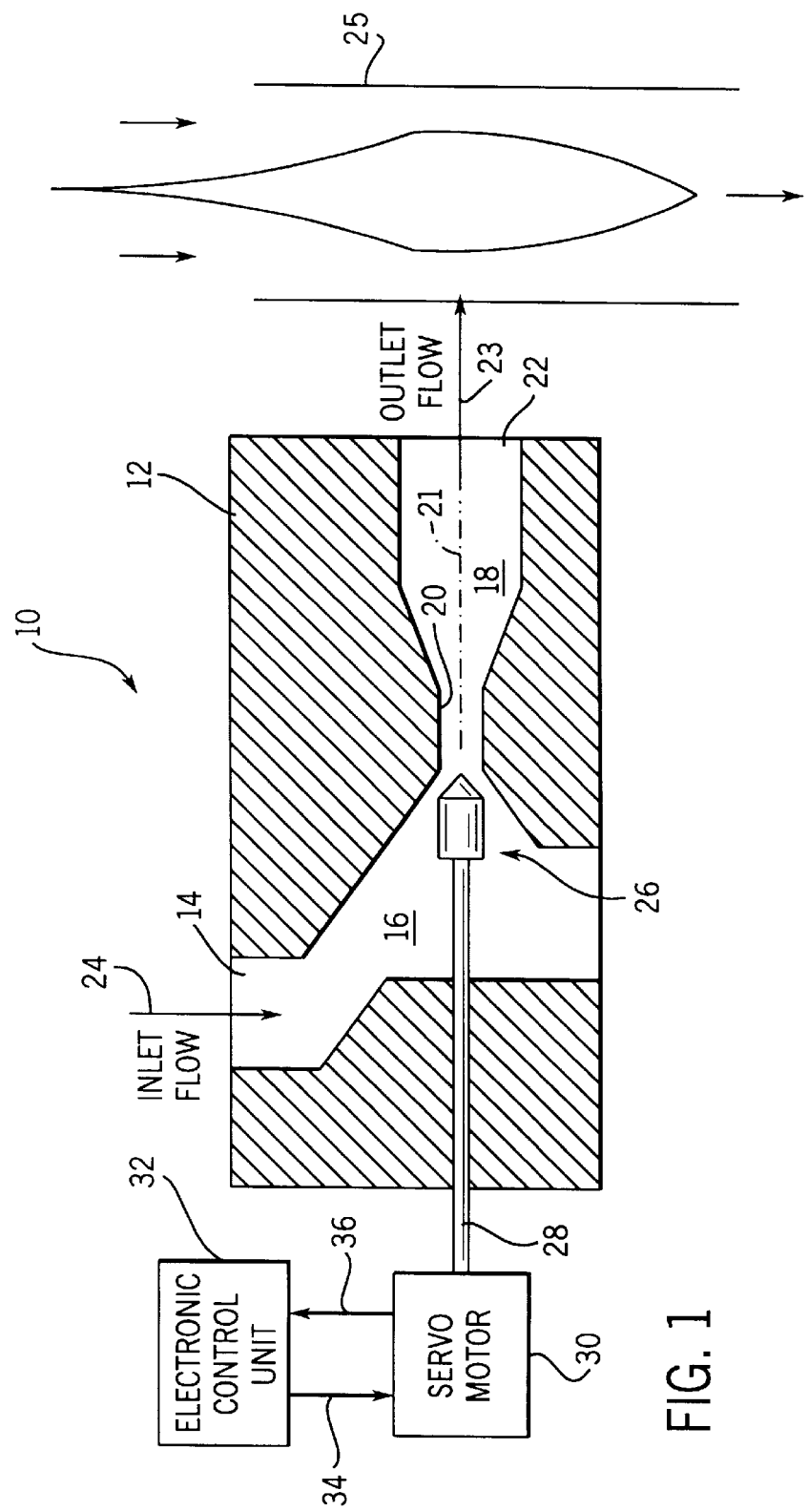
FIG. 1 is a schematic view of the metering valve of the present invention coupled to a jet engine.

Referring now to FIG. 1, a metering valve 10 of the present invention includes a housing 12 which defines an inlet port 14 communicating with a fuel chamber 16 leading through a venturi passageway 18 having a throat region 20 to an outlet port 22. The venturi passageway and outlet port are concentric with a pintle axis 21. Fuel is received from a supply line 24 into the inlet port 14 and fed into the fuel chamber 16. Fuel in the fuel chamber 16 is metered through the venturi passageway 18 and out the outlet port 22 to piping 23 leading to a combustion chamber of a jet engine, and in particular, a scramjet engine 25. The fuel can be any suitable liquid or gaseous fuel or ignitor, however, for scramjet engines it is preferred to use a gaseous hydrogen for sustained operation and gaseous hydrogen with silane for ignition. During operation of the scramjet engine 25, the pressure at the inlet port 14 is approximately 1100 psia and 875 psia at the outlet port 22.

Referring still to FIG. 1, the fuel is metered according to the position of a movable pintle 26. The pintle 26 includes a stem 28 engaged with an actuation device, such as a servo motor 30, for axial movement of the pintle 26 into or away from the throat 20 of the venturi passageway. The servo motor 30 is controlled by an electronic control unit (ECU) 32 which sends input signals to the motor 30 via leads 34. The ECU 32 receives pintle position data through feedback leads 36.

Figure 2:
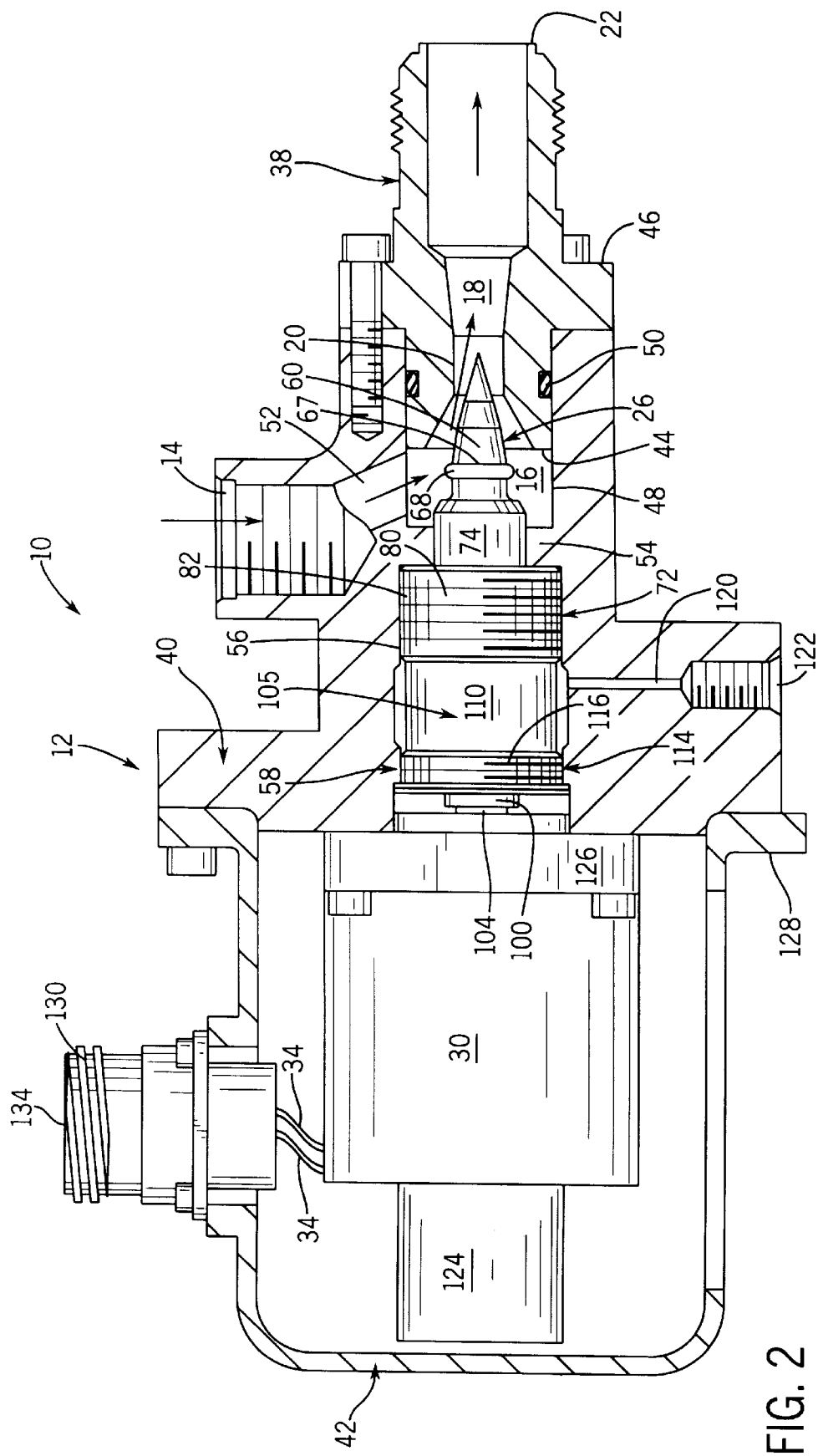
FIG. 2 is a partial cross-sectional view through the housing of the valve of the showing the axial pintle in a retracted position allowing maximum flow through the valve.

Referring now to FIG. 2, the valve 10 is shown in partial cross-section with the pintle 26 completely retracted so as to allow maximum fuel flow through the venturi passageway 18. The housing 12 is actually comprised of a venturi nozzle module 38, a valve housing 40 and a motor housing 42. All of these components are made of a light-weight, durable material, preferably an anodized aluminum.

Referring still to FIG. 2, the nozzle module 38 has an axial bore defining the outlet port 22 at one end and the venturi passageway 18 extending therefrom to a mouth 44. The exterior surface of the nozzle module 38 is suitably configured at the outlet port end for mating with piping 23 (see FIG. 1) leading to the scramjet engine 25. The nozzle module 38 also defines an annular flange 46 having bores aligned with bores in the valve housing 40 and receiving locking fasteners for securing the nozzle module 38 to the valve housing 40. The mouth end of the nozzle module 38 is sized to fit within an axial fuel chamber bore 48 at an end of the valve housing 40 so that a circumferential seal 50 seals the fuel chamber bore 48. It is important that there are very close tolerances between the fuel chamber bore 48 and the outer diameter of the nozzle module 38 to reduce the possibility of the seal 50 extruding through gaps between the components when the valve is under pressure and thereby allowing fuel to leak around the nozzle module 38. The 50 seal is preferably a suitable packing ring having a low friction backup to reduce extrusion of the packing ring.

The venturi passageway 18 enables the fuel to reach sonic velocity at the throat 20. Reaching sonic velocity reduces noise frequencies within the fuel chamber 16 from the passing fuel which would otherwise adversely affect the performance of the valve. Moreover, the venturi configuration provides the benefits of noise reduction without creating a high pressure loss between the fuel chamber 18 and the outlet port 22. The benefits of venturi type passageways are well known in the art, and therefore, will not be discussed at length herein.

Figures 3, 5:
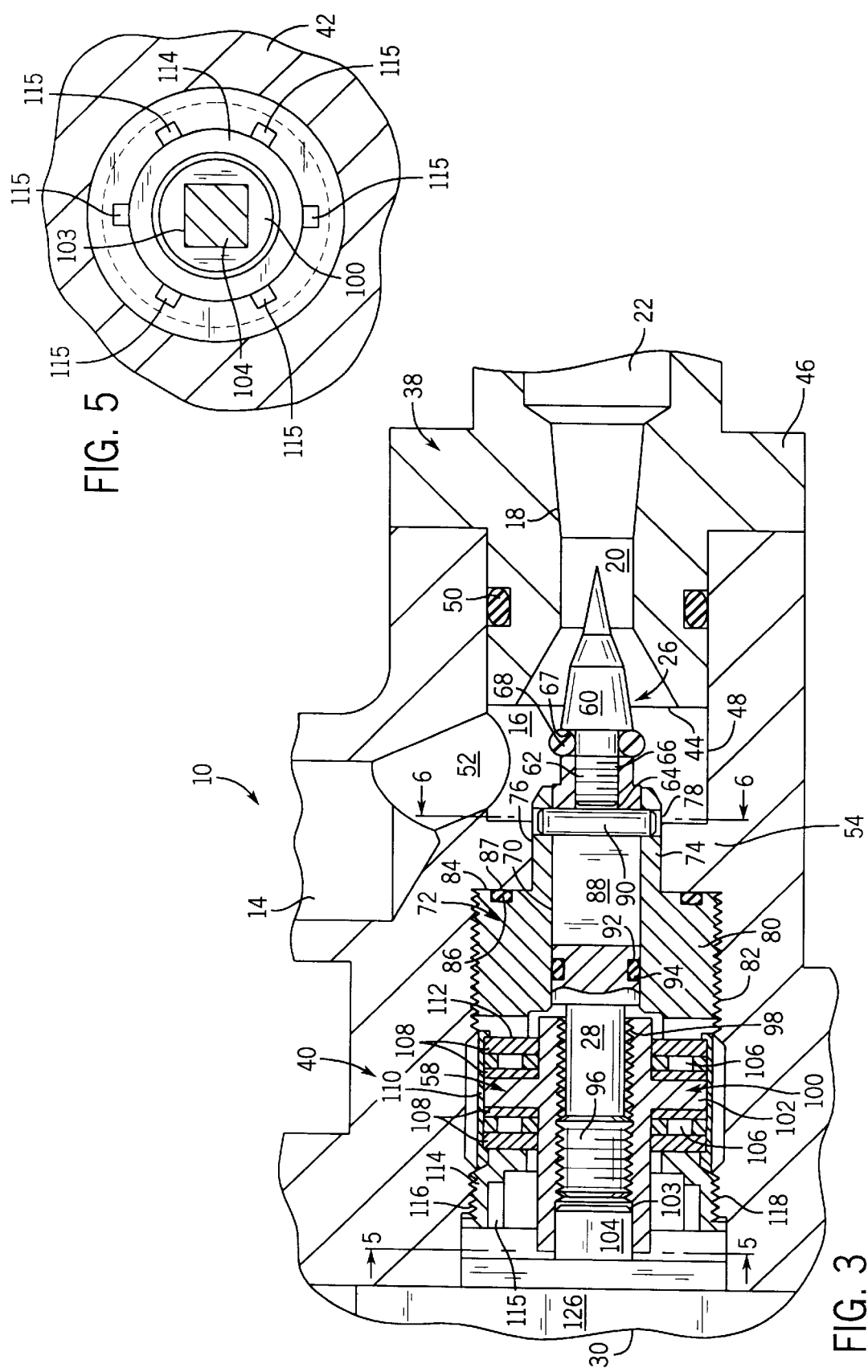
FIG. 3 is an enlarged cross-sectional view through the housing and drive assembly of the valve of FIG. 2.
FIG. 5 is a cut-away cross-sectional view taken along line 5—5 of FIG. 4 showing the connection of a pintle stem to a motor shaft.

Referring to FIGS. 2–3, the valve housing 40 defines the inlet port 14 joined to the fuel chamber 16 by a channel 52. A central partition 54 separates the fuel chamber 16 from a cylindrical drive chamber 56 containing a drive assembly 58 for positioning the pintle 26.

The pintle 26 is comprised of a pintle head 60 and the pintle stem 28. The pintle head 60 has a threaded end 62 mated within a threaded bore 64 at one end of the pintle stem 28. Preferably, a known locking insert 66 locks the mating threads of the pintle stem 28 and head 60. The pintle head 60 is preferably made of a Beryllium-Copper composite and defines a contoured profile designed for a specific fuel rate. The pintle head 60 may be removed and replaced with a differently contoured head according to the flow rate requirements of particular applications. The pintle head 60 has a groove 67 about its circumference in which a seal 68 is disposed. The seal 68 is preferably a resilient elastomer ring having a cap strip made of a low-friction material such as Teflon. The seal 68 has an outer diameter essentially the same as, or slightly larger, than the throat 20 of the venturi passageway 18. The groove 67 is located so that the seal 68 can mate with the throat 20 and positively shut off the venturi passageway 18 when the pintle 26 is in the extended position shown in FIG. 4.

Referring again to FIGS. 2–3, the pintle stem 28 rides within an axial bore 70 in a pintle guide 72 disposed within the drive chamber 56. The pintle guide 72 has a front end 74 fitting within an opening 76 in the central partition 54 and having a transverse through bore 78. The pintle guide 72 has an externally threaded back end 80 of greater diameter than the front end 74 mating with internal threads 82 at the inner diameter of the drive chamber 56. A front face 84 of the back end 80 defines a radial groove 86 containing a suitable packing seal 87 for sealing the pintle guide 72 to the valve housing 40. Referring momentarily to FIGS. 3 and 6, the pintle stem 28 defines a transverse axial slot 88 which receives a suitably sized pin 90 disposed within the through bore 78 of the pintle guide front end 74. This pin and slot connection prevents the pintle 26 from rotating and allows the pintle 26 to translate along the pintle axis 21, as described below.

Referring again to FIG. 3, the pintle stem 28 also defines a circumferential groove 92 containing a suitable low friction seal 94 for sealing the pintle stem 28 to the axial bore 70 of the pintle guide 72. The pintle stem seal 94 is located so as to maintain such a seal throughout the stroke of the pintle 26. The pintle stem 28 includes external threads 96 at the end opposite the pintle head 60 for engaging with internal threads 98 of a drive nut 100. These threads 96, 98 are preferably class 3A and 3B fine or extra fine series threads having close tolerances thereby providing for fine position adjustment.

Referring again to FIGS. 2–3, the drive nut 100 is preferably a cylinder made of a Beryllium-Copper composite having the threads 98 at its inner diameter and an annular flange 102 at an intermediate position between its ends. At one end, the drive nut 100 also defines a suitably sized square socket 103 for coupling to a square shaft 104 of the servo motor 30 in a press fit. When the motor 30 is energized to rotate the drive nut 100 in either direction, the drive nut threads 98 engage with the pintle stem threads 96. Referring to FIGS. 3 and 6, The pintle 26 is prevented from rotating by virtue of the pin and slot arrangement mentioned above. Specifically, the pin 90 is held within the through bore 78 in the pintle guide 72 which is fixed to the valve housing 40. The fixed pin 90 is also disposed within the pintle stem slot 88 and engages with the slot 88 to prevent rotation of the pintle 26. Consequently, the rotational force of the drive nut 100 is transferred to an axial force so that the pintle 26 translates along the pintle axis 21 into and away from the venturi passageway 18 when the motor 30 is energized.

Disposed about the outer diameter of the drive nut 100 is a force distribution assembly 105 having thrust bearings 106, thrust washers 108 and a containment sleeve 110. The thrust bearings 106 and washers 108 are standard high precision components commercially available from the Torrington Company of Torrington, CT. On each side of the drive nut flange 102, one thrust bearing 106 is disposed between two thrust washers 108. The containment sleeve 110 fits over the outer diameter of the thrust bearings 106 and washers 108 to keep the assembly together and fix the outer race of the bearings 106 to the valve housing 40. The assembly is fixed in place by an axial inference fit between a surface 112 of the pintle guide 56 and a fixed retainer nut 114 having external threads 116 mating with internal threads 118 of the drive chamber 56. The retainer nut 114 has key slots 115 (see FIG. 5) for fastening to the valve housing 40. This arrangement prevents any of the threaded connections from loosening due to vibration. The force distribution assembly 105 transfers pressure forces acting on the pintle 26 from the metered fuel to the valve housing 40, rather than the motor 30. Thus, the motor 30 does not have to overcome these pressure forces in order to maintain the pintle 26 in a desired position or when repositioning the pintle 26. Otherwise, such loads could cause inaccurate pintle 26 positioning as well as reduce adjustment responsiveness and operational life of the motor 30.

All of the components of the drive assembly 58 and force distribution assembly 105 operate in an isolated, low friction environment separate from the fuel by virtue of the pintle stem seal 94 and the pintle guide seal 87. Thus, the drive assembly 58 is free from any contaminants in the fuel that could increase friction and prematurely wear its components. In the event one or both of the pintle stem 94 and guide 87 seals were to fail, the drive chamber 56 has an increased diameter portion adjacent the containment sleeve 110 and a drain channel 120 extending downward therefrom. The rotating drive components will direct fuel within the drive chamber 56 toward the increased diameter and out the drain channel 120. The drained fuel can exit the valve housing 40 through a drain port 122.

Referring to FIGS. 2 and 5, the motor housing 42 defines a space for enclosing the servo motor 30, which is preferably a known direct current magnetic brushless motor having an integral shaft position sensor (not shown) and a suitable brake 124, thus providing an inherently infinite-position actuator. The motor 30 is mounted to the valve housing 40 at a flange 126 so that the shaft 104 is axially aligned with the pintle 26. The motor housing 42 is likewise mounted to the valve housing 40 at a flange 128. The motor housing 42 includes a power lead connector assembly 130 and a instrument lead connector assembly (not shown), each defining a threaded port for connecting power leads 34 and feedback leads 36, respectively, to the motor 30. The power 130 and instrument connector assemblies are spaced apart to separate the power 34 and feedback 36 leads to reduce power signal noise from corrupting pintle position data sent through the feedback leads 36.

As mentioned, the ECU 32 is used to control the operation of the motor 30. The ECU 32 supplies power input signals to the motor as needed to reposition the pintle 26 so as to adjust the fuel flow rate as needed. The ECU 32 includes a suitable processor (not shown) for processing pintle position information so as to make necessary corrections should the pintle deviate from its expected position. The ECU 32 may also process and make pintle position adjustments according to pressure and temperature data sent via additional leads (not shown) coupled to pressure and temperature sensors (not shown) within the valve housing 40 or coupled to the fuel supply line Empirical studies of the valve 10 of the present invention indicate that it is capable of operating at a flat frequency response up to at least 7 Hz, having a turn down ratio of approximately 50 to 1 with positive shut-off. The valve 10 is capable of moving between a fully open and a fully closed position in approximately 130 milliseconds in both directions. The valve 10 also exhibits very low hysteresis and threshold values, each approximately one percent of full scale input. Additionally, the pintle head 60 and stem 28 seals have consistently demonstrated leakage of less than $10^{-3}$ standard cubic centimeters per second of gaseous helium when pressurized to 1,800 psid. Moreover, the valve weighs less than five pounds due to the relative low number of components and the use of lightweight materials. Thus, the present invention provides a highly responsive and reliable valve meeting the demands of metering fuel to jet engines of all types, and in particular, to scramjet engines.

The present invention may include other aspects not specifically delineated in the aforementioned preferred embodiments. Although the valve is suitable for use with scramjet engines, it may be used to meter gaseous or liquid fuel to other devices. For example, the valve can be used with gas turbine generators, fuel cells, or other comparable devices. Thus, the above in no way is intended to limit the scope of the invention. Accordingly, in order to apprise the public of the full scope of the present invention, reference must be made to the following claims.

What is claimed is:

1. A valve for metering liquid or gaseous fuel from a fuel supply, the valve comprising:
    a housing defining a fuel chamber in communication with an inlet port coupled to the fuel supply and via a nozzle passageway in communication with an outlet port;
    a pintle extending along a pintle axis concentric with the nozzle passageway, the pintle having a stem at one end and a contoured head at an opposite end with a seal about its circumference;
    an axial drive assembly concentric with the pintle axis and in threaded communication with the pintle stem so as to move the pintle head from a retracted position allowing passage of fuel through the outlet port to an extended position in which the circumferential seal closes the passageway so that no fuel can exit the outlet port, the drive assembly including a force plate in communication with a thrust bearing for transferring to the housing pressure forces acting on the pintle.

2. The valve of claim 1, wherein the nozzle passageway is a venturi passageway having a throat through which fuel flows at sonic velocity, the throat having an inner diameter that can be sealed by the circumferential seal at the pintle head.

3. The valve of claim 2, wherein the venturi passageway and outlet port are part of a venturi module, the venture module having an entrance end disposed within the fuel chamber, fastened to the housing and sealed by a circumferential seal.

4. The valve of claim 1, wherein the pintle is disposed within an axial bore within the housing and the pintle stem includes a seal about its circumference located so as to seal the axial bore throughout the stroke of the pintle thereby isolating the axial drive assembly from fuel in the fuel chamber.

5. The valve of claim 1, wherein the axial drive assembly further includes:
    an actuator having a rotatable shaft concentric with the pintle axis;
    a drive nut coupled to the actuator shaft at one end and having threads at an opposite end for engaging a threaded end of the pintle stem.

6. The valve of claim 5, wherein a fixed member secured to the housing contacts the pintle to prevent its rotation so that rotation of the drive nut causes translation of the pintle along the pintle axis between the retracted and extended positions.

7. The valve of claim 6, wherein the fixed member is a pin and wherein the pintle stem has an axially extending transverse slot in which is disposed the pin preventing the pintle from rotating.

8. The valve of claim 7, further comprising a pintle guide having an axial bore concentric with the pintle axis in which the pintle stem is disposed and a transverse bore aligned with the transverse pintle stem slot in which the pin is disposed, the pintle guide being fastened to the housing and sealed to the housing by an annular seal.

9. The valve of claim 8, further comprising a seal at the circumference of the pintle stem located so as to seal the axial bore of the pintle guide throughout the stroke of the pintle thereby isolating the axial drive assembly from fuel in the fuel chamber.

10. The valve of claim 5, wherein the force plate is an annular flange of the drive nut.

11. The valve of claim 10, wherein the drive assembly further includes at least one annular thrust washer adjacent to the thrust bearing.

12. The valve of claim 11, wherein the drive nut flange is flanked by two annular thrust bearings each disposed between two annular thrust washers.

13. The valve of claim 12, further comprising a containment sleeve disposed about the outer diameter of the thrust washers and the thrust bearings, the sleeve being held fixed by an interference fit between a pintle guide and a retaining nut both fixed to the housing, whereby the fit of the retaining nut, sleeve and pintle guide prevents separation of these components from the housing by vibration.

14. The valve of claim 5, wherein the actuator is an electromagnetic servo motor.

15. The valve of claim 14, wherein the shaft is square and the drive nut is mounted to the shaft at a square socket concentric with the pintle axis.

16. The valve of claim 14, further comprising a motor housing containing the servo motor and mounting to the valve housing.

17. The valve of claim 16, wherein the motor housing includes a power lead connection and an instrument lead connection for attaching respective power and instrument leads to the motor, whereby the power and instrument leads are separated to prevent corruption of feedback signals by noise from the power leads.

18. The valve of claim 1, wherein the pintle head and stem are joined at a threaded connection, whereby the pintle head may be replaced with a pintle head of different contour so as to change the flow rate of media through the valve.

19. The valve of claim 18, wherein a locking insert is disposed at the mated threads to prevent the pintle head from separating from the pintle stem.

20. The valve of claim 1, wherein the pintle head seal includes a resilient ring having a Teflon cap strip.

21. A sonic venturi valve for metering fuel from a fuel supply to a combustion chamber of a scramjet engine, the valve having a housing defining a fuel chamber in communication with an inlet port coupled to the fuel supply and an outlet port coupled to the combustion chamber via a venturi passageway having a throat through which fuel flows at sonic velocity, the valve comprising:
    (A) a pintle extending along a pintle axis concentric with the venturi passageway, the pintle having a stem connected to a contoured head containing a circumferential seal sized to seal with the throat of the venturi passageway, the pintle stem having an axially extending transverse slot in which is disposed a pin fixed to the housing for preventing the pintle from rotating;
    (B) a pintle guide having an axial bore concentric with the pintle axis in which the pintle stem is disposed and a transverse bore aligned with the transverse pintle stem slot in which the pin is disposed, the pintle guide being fastened to the housing within a drive chamber and sealed to the housing by an annular seal, the axial bore being sized to contact a pintle stem seal throughout the stroke of the pintle;
    (C) a pintle drive mechanism including:
        (i) a servo motor contained within a motor housing connected to the valve housing so that a shaft extends into the housing along the pintle axis;

(ii) a drive nut mounted at one end to the motor shaft and having a central bore in which the pintle stem is disposed for engaging the pintle stem at mating threads; and (D) a force distribution assembly comprising:
  (i) a pair of annular thrust bearings disposed about the drive nut, one on each side of an annular drive nut flange;
  (ii) a pair of annular thrust washers disposed about the drive nut, one on each side of each thrust bearing;
  (iii) an annular sleeve disposed about the outer diameter of the thrust washers, the thrust bearings and the drive nut flange, the sleeve being held fixed by an interference fit between the pintle guide and a retaining nut fixed to the housing such that the retaining nut and pintle guide cannot separate from the housing by vibration;

whereby the motor rotates the drive nut which in turn engages the pintle stem causing translation of the pintle along the pintle axis between an open position allowing media to exit the outlet port and a closed position in which the pintle seal positively engages with the venturi passageway to prevent media from exiting the outlet port.

* * * * *